United States Patent
Sakai et al.

(10) Patent No.: US 10,634,834 B2
(45) Date of Patent: *Apr. 28, 2020

(54) OPTICAL FILM, POLARIZING PLATE, AND IMAGE DISPLAY DEVICE

(71) Applicant: FUJIFILM Corporation, Tokyo (JP)

(72) Inventors: Shinnosuke Sakai, Kanagawa (JP); Ayako Muramatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,981

(22) Filed: Aug. 2, 2017

(65) Prior Publication Data

US 2017/0329063 A1 Nov. 16, 2017

Related U.S. Application Data

(63) Continuation of application No. PCT/JP2016/053272, filed on Feb. 3, 2016.

(30) Foreign Application Priority Data

Feb. 4, 2015 (JP) ................................. 2015-020700
Sep. 1, 2015 (JP) ................................. 2015-171757

(51) Int. Cl.
*G02F 1/1333* (2006.01)
*G02B 5/30* (2006.01)
*C09K 19/20* (2006.01)
*C09K 19/30* (2006.01)
*C09K 19/34* (2006.01)
*C09K 19/54* (2006.01)
*C09K 19/04* (2006.01)

(52) U.S. Cl.
CPC ........ *G02B 5/3016* (2013.01); *C09K 19/2021* (2013.01); *C09K 19/3068* (2013.01); *C09K 19/3402* (2013.01); *C09K 19/3491* (2013.01); *C09K 19/3497* (2013.01); *C09K 19/542* (2013.01); *G02B 5/3083* (2013.01); *C09K 2019/0448* (2013.01); *C09K 2019/2035* (2013.01); *C09K 2019/3075* (2013.01); *C09K 2019/3077* (2013.01); *C09K 2019/3422* (2013.01); *C09K 2219/03* (2013.01); *G02B 5/3025* (2013.01)

(58) Field of Classification Search
CPC ............ C09K 19/2021; C09K 19/3068; C09K 19/3402; C09K 19/3491; C09K 19/3497; C09K 19/542; C09K 2019/0448; C09K 2019/2035; C09K 2019/3075; C09K 2019/3077; C09K 2019/3422; C09K 2219/03; G02F 1/1333; G02B 5/3016; G02B 5/3083; G02B 5/3025
USPC ...................................................... 252/299.01
See application file for complete search history.

(56) References Cited

U.S. PATENT DOCUMENTS

| | | | | |
|---|---|---|---|---|
| 7,811,469 B2 * | 10/2010 | Takeuchi | ........... | C09K 19/2007 252/299.01 |
| 2009/0268143 A1 | 10/2009 | Takeuchi et al. | | |
| 2017/0349828 A1 * | 12/2017 | Katoh | ........... | B32B 7/02 |

FOREIGN PATENT DOCUMENTS

| | | |
|---|---|---|
| JP | 08-283718 A | 10/1996 |
| JP | 2006-258854 A | 9/2006 |
| JP | 2014-077068 A | 5/2014 |
| WO | 2014/132978 A | 9/2014 |

OTHER PUBLICATIONS

Office Action issued by the Korean Intellectual Property Office dated May 17, 2018, in connection with Korean Patent Application No. 10-2017-7021041.
Notification of Reasons for Refusal issued by the Japanese Patent Office on Mar. 13, 2018, in connection with Japanese Patent Application No. 2016-573409.
International Search Report issued in PCT/JP2016/053272 dated Apr. 19, 2016.
Written Opinion issued in PCT/JP2016/053272 dated Apr. 19, 2016.
International Preliminary Report on Patentability issued by WIPO dated Aug. 17, 2017, in connection with International Patent Application No. PCT/JP2016/053272.
Office Action issued by the State Intellectual Property Office of People's Republic of China dated Dec. 28, 2018, in connection with corresponding Chinese Patent Application No. 201680008766.1.

* cited by examiner

*Primary Examiner* — Geraldina Visconti
(74) *Attorney, Agent, or Firm* — Edwards Neils LLC; Jean C. Edwards, Esq.

(57) ABSTRACT

An object of the present invention is to provide an optical film having excellent alignment, and a polarizing plate and an image display device using the same. The optical film of the present invention is an optical film having at least an optically anisotropic layer, and the optically anisotropic layer contains a smectic liquid crystal compound not including a fluorine atom and a compound partially having a cyclohexane ring in which the hydrogen atom is substituted with a linear alkyl group.

18 Claims, 1 Drawing Sheet

OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2016/053272 filed on Feb. 3, 2016, which was published under PCT Article 21(2) in Japanese, and which claims priority under 35 U.S.C. § 119(a) to Japanese Patent Application No. 2015-020700 filed on Feb. 4, 2015 and Japanese Patent Application No. 2015-171757 filed on Sep. 1, 2015. The above applications are hereby expressly incorporated by reference, in their entirety, into the present application.

BACKGROUND OF THE INVENTION

1. Field of the Invention

The present invention relates to an optical film, a polarizing plate, and an image display device.

2. Description of the Related Art

Optical compensation sheets are used for various image display devices to eliminate image coloration and to broaden the viewing angle.

Stretched birefringent films have conventionally been employed as optical compensation sheets. However, in recent years, instead of stretched birefringent films, the use of optical compensation sheets having an optically anisotropic layer formed of liquid crystal compounds has been proposed.

As such an optical compensation sheet, for example, JP2014-077068A discloses an optically anisotropic film which contains a predetermined polymerizable liquid crystal compound and is obtained by polymerizing a polymerizable liquid crystal composition which is nemataic at room temperature ([claim 1], [claim 3], and [claim 6]).

SUMMARY OF THE INVENTION

The present inventors have found that when the inventors have conducted investigations on the optically anisotropic film (optically anisotropic layer) disclosed in JP2014-077068A, the alignment of the optically anisotropic layer to be formed becomes poor depending on the type of the polymerizable liquid crystal compound to be used.

Here, an object of the present invention is to provide an optical film having an optically anisotropic layer having excellent alignment, and a polarizing plate and an image display device using the same.

As a result of intensive investigations to achieve the above object, the present inventors have found that an optically anisotropic layer containing a predetermined smectic liquid crystal compound and a compound partially having a cyclohexane ring to which an alkyl group is bonded has excellent alignment and thus have completed the present invention.

That is, it has been found that the above object can be achieved by adopting the following configurations.

[1] An optical film comprising at least: an optically anisotropic layer, in which the optically anisotropic layer contains a smectic liquid crystal compound not including a fluorine atom and a compound partially having a cyclohexane ring in which a hydrogen atom is substituted with a linear alkyl group.

[2] The optical film according to [1], in which the smectic liquid crystal compound is a compound having at least three ring structures selected from the group consisting of a benzene ring and a cyclohexane ring.

[3] The optical film according to [1] or [2], in which the smectic liquid crystal compound is a compound represented by Formula (1) which will be described later.

[4] The optical film according to any one of [1] to [3], in which an average tilt angle of the smectic liquid crystal compound in the optically anisotropic layer is 1.0° or less.

[5] The optical film according to any one of [1] to [4], in which an alignment order parameter of the optically anisotropic layer is 0.8 or greater and 1.0 or less.

[6] The optical film according to any one of [1] to [5], in which the optically anisotropic layer further contains liquid crystal compounds other than the smectic liquid crystal compound, and a total number of benzene rings and cyclohexane rings included in the smectic liquid crystal compound is the same as a total number of benzene rings and cyclohexane rings included in other liquid crystal compounds.

[7] A polarizing plate comprising: the optical film according to any one of [1] to [6]; and a polarizer.

[8] An image display device comprising: the optical film according to any one of [1] to [6]; or the polarizing plate according to [7].

According to the present invention, it is possible to provide an optical film having an optically anisotropic layer having excellent alignment, and a polarizing plate and an image display device using the same.

DESCRIPTION OF THE PREFERRED EMBODIMENTS

Hereinafter, the present invention will be described in detail.

The description of the constitutional requirements described below is made on the basis of representative embodiments of the present invention, but it should not be construed that the present invention is limited to those embodiments.

In this specification, numerical value ranges expressed by the term "to" mean that the numerical values described before and after "to" are included as a lower limit and an upper limit, respectively.

[Optical Film]

An optical film of the present invention is an optical film having at least an optically anisotropic layer, and the optically anisotropic layer contains a smectic liquid crystal compound not including a fluorine atom, and a compound partially having a cyclohexane ring in which one hydrogen atom is substituted with a linear alkyl group (hereinafter, also abbreviated as "alkyl cyclohexane ring-containing compound").

The present inventors have found that the alignment of the optically anisotropic layer becomes satisfactory by incorporating the smectic liquid crystal compound not including a fluorine atom and the alkyl cyclohexane ring-containing compound into the layer as described above.

Although the details are not clear, the present inventors assume as follows.

First, since smectic liquid crystals have a low degree of freedom in alignment compared to nematic liquid crystals, it is assumed that disorder in the alignment state occurs at the time of transition, aging, and curing, and thus uniformity in alignment is lost.

Here, the present inventors have conducted investigations based on the thought that when an additive having rigidity capable of maintaining alignment even when the additive is mixed with a liquid crystal compound and flexibility capable of eliminating alignment disorder is formulated, the alignment of the smectic liquid crystals can be improved. Specifically, the present inventors have conducted various investigations on the assumption that rigidity is obtained from a ring structure such as a benzene ring or a cycloalkyl ring and flexibility is obtained from a structure having high rotational properties such as an alkyl chain.

As a result, the present inventors have found that the alignment of the smectic liquid crystals becomes satisfactory by using an alkyl cyclohexane ring-containing compound having a structure in which a flexible linear alkyl group is directly bonded to a rigid cycloalkyl ring.

The present inventors have found that when the smectic liquid crystal compound has a fluorine atom, even in the case of using the alkyl cyclohexane ring-containing compound, the alignment is not improved due to a high electronegativity of the fluorine atom.

Figure 1A:
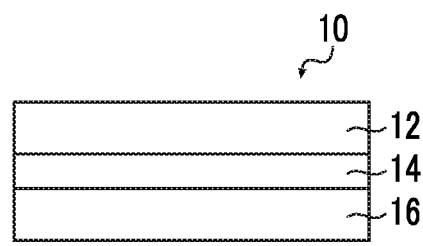
FIGS. 1A to 1C are cross-sectional views schematically showing examples of an optical film according to the present invention, respectively.
Figure 1B:
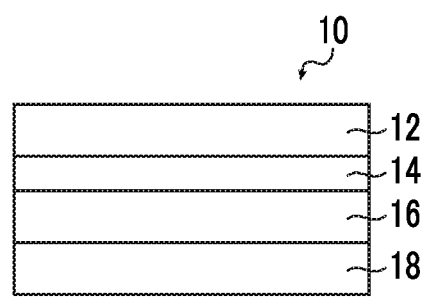
Figure 1C:
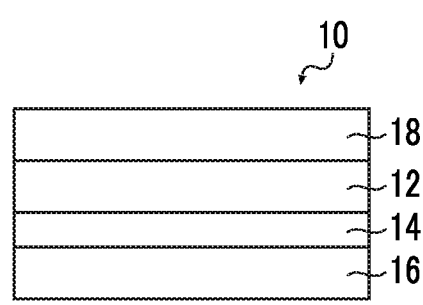

FIGS. 1A to 1C are cross-sectional views schematically showing examples of the optical film according to the present invention, respectively.

FIGS. 1A to 1C are schematic views and the thicknesses relationship and positional relationship between the respective layers or the like do not necessarily coincide with actual ones. Any of the support, alignment film, and hard coat layer shown in FIGS. 1A to 1C is an arbitrary constitutional member.

An optical film 10 shown in FIGS. 1A to 1C has a support 16, an alignment film 14, and an optically anisotropic layer 12 in this order.

In addition, the optical film 10 may have a hard coat layer 18 on the side of the support 16 opposite to the side on which the alignment film 14 is provided as shown in FIG. 1B and may have a hard coat layer 18 on the side of the optically anisotropic layer 12 opposite to the side on which the alignment film 14 is provided as shown in FIG. 1C.

Hereinafter, various members used for the optical film of the present invention will be described in detail.

[Optically Anisotropic Layer]

The optically anisotropic layer of the optical film of the present invention contains a smectic liquid crystal compound not including a fluorine atom and an alkyl cyclohexane ring-containing compound.

<Smectic Liquid Crystal Compound>

Smectic liquid crystal compounds are compounds that can exhibit smectic liquid crystallinity in optically anisotropic layers formed of only these liquid crystal compounds.

Here, the optically anisotropic layer exhibiting smectic liquid crystallinity refers to an optically anisotropic layer in which, when a periodic structure in the in-plane direction parallel with the director direction of the liquid crystal compound is analyzed by X-ray diffraction, the diffraction angle 2θ (an angle formed between an incident X-ray direction and a diffracted X-ray direction) is 1° or greater and 3° or less, and the half-width value of the X-ray diffraction peak is within 0.6°. For example, as the X-ray diffraction device, R-AXIS (Cu-ray source (50 kV·300 mA)) manufactured by Rigaku Corporation can be used to perform measurement.

In the present invention, among such smectic liquid crystal compounds, a compound not including a fluorine atom in the molecule is used.

The smectic liquid crystal compound is preferably a compound having at least three ring structures selected from the group consisting of a benzene ring and a cyclohexane ring for the reason that smectic properties are easily exhibited by pseudo phase separation of the rigid mesogenic moiety and the flexible side chain and sufficient rigidity is exhibited.

In addition, from the viewpoint of imparting moisture-heat resistance to the optically anisotropic layer, a compound having two or more polymerizable groups (for example, (meth)acryloyl group, vinyl group, styryl group, and allyl group) is preferable.

Here, the expression "(meth)acryloyl group" represents an acryloyl group or a methacryloyl group.

Specific examples of such a smectic liquid crystal compound include a compound represented by the following Formula L-1 (liquid crystal compound L-1), a compound represented by the following Formula L-3 (liquid crystal compound L-3), a compound represented by the following Formula L-6 (liquid crystal compound L-6), a compound represented by the following Formula L-8 (liquid crystal compound L-8), and a compound represented by the following Formula L-10 (liquid crystal compound L-10).

The group adjacent to the acryloyloxy group in the following Formula L-1 represents a propylene group (a group in which a methyl group is substituted with an ethylene group), and the liquid crystal compound L-1 represents a mixture of positional isomers in which methyl group positions are different.

L-1

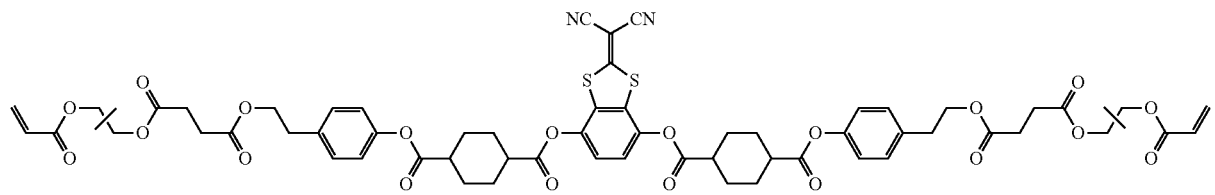

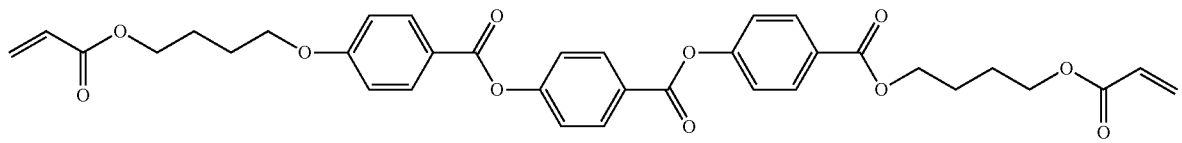

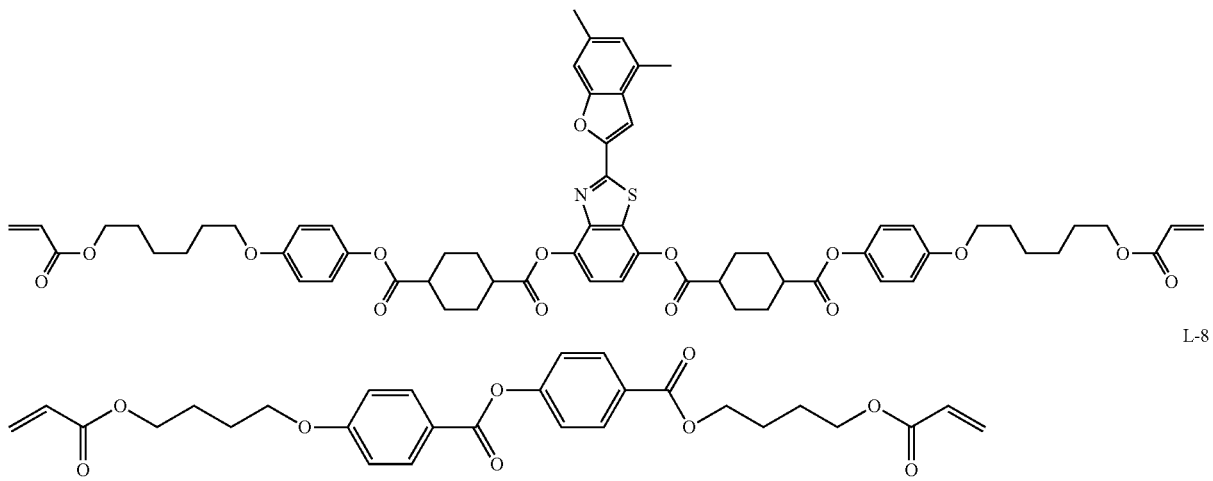

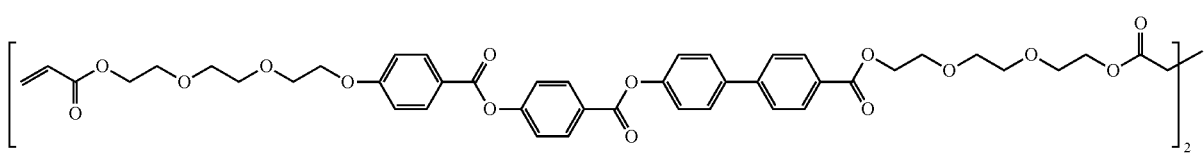

In addition, as the smectic liquid crystal compound, for the reason that the alignment of the optically anisotropic layer becomes more satisfactory due to an electronic interaction occurring between the liquid crystal molecules, a compound having a structure represented by the following formula (1) is preferable.

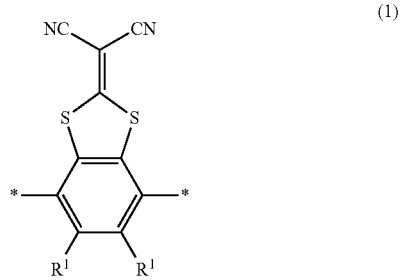

Here, in the above Formula (1), * represents a bonding position and $R^1$'s each independently represent a hydrogen atom or an alkyl group having 1 to 6 carbon atoms.

As the compound having the structure represented by the above Formula (1), the liquid crystal compound L-1 in which both $R^1$'s in the above Formula (1) represent a hydrogen atom is suitably used. The bonding position represented by * in the above Formula (1) represents a bonding position with an oxygen atom in the liquid crystal compound L-1.

<Other Liquid Crystal Compounds>

In the present invention, the optically anisotropic layer may include liquid crystal compounds other than the above-described smectic liquid crystal compound.

Examples of other liquid crystal compound include a nematic liquid crystal compound, and specific examples thereof include a compound represented by the following Formula L-2 (liquid crystal compound L-2), a compound represented by the following Formula L-4 (liquid crystal compound L-4), a compound represented by the following Formula L-9 (liquid crystal compound L-9), and a compound represented by the following Formula L-11 (liquid crystal compound L-11), which are used in examples to be described later.

The group adjacent to the acryloyloxy group in the following Formula L-2 represents a propylene group (a group in which a methyl group is substituted with an ethylene group) and the liquid crystal compound L-2 represents a mixture of positional isomers in which methyl group positions are different.

In the case in which the optically anisotropic layer contains the above-described smectic liquid crystal compound and other liquid crystal compounds, the content of the smectic liquid crystal compound is preferably at least 35% by mass or more with respect to the total mass of the smectic liquid crystal compound and other liquid crystal compounds.

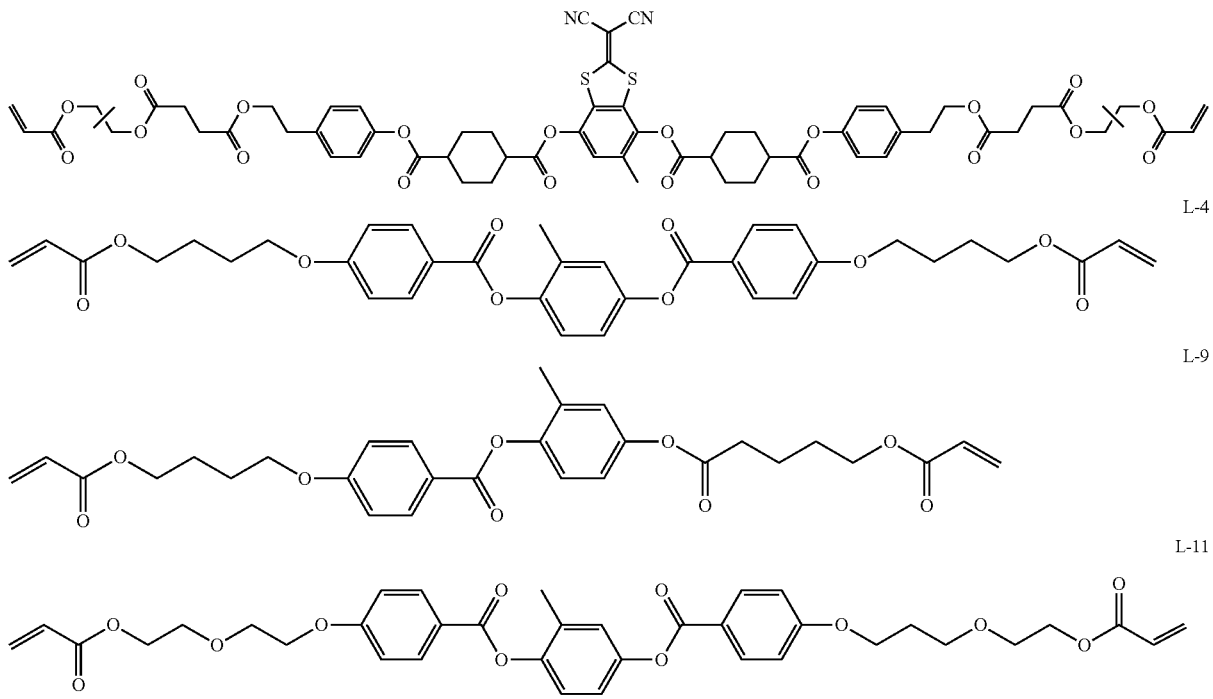

In the present invention, in the case in which the optically anisotropic layer contains other liquid crystal compounds (particularly, a nematic liquid crystal compound), for the reason that the alignment of the optically anisotropic layer becomes more satisfactory, it is preferable that the total number of benzene rings and cyclohexane rings included in the smectic liquid crystal compound is the same as the total number of benzene rings and cyclohexane rings included other liquid crystal compounds.

<Alkyl Cyclohexane Ring-Containing Compound>

The alkyl cyclohexane ring-containing compound contained in the optically anisotropic layer is a compound partially having a cyclohexane ring in which one hydrogen atom is substituted with a linear alkyl group.

Here, the expression "compound partially having a cyclohexane ring in which one hydrogen atom is substituted with a linear alkyl group" refers to a cyclohexane ring in which, for example, in the case of a compound having two cyclohexane rings as shown in the following Formula (2), one hydrogen atom of the cyclohexane ring present on the molecule terminal side is substituted with a linear alkyl group.

Examples of the alkyl cyclohexane ring-containing compound include compounds having a structure represented by the following Formula (2) and among the compounds, from the viewpoint of imparting moisture-heat resistance to the optically anisotropic layer, a compound having a (meth) acryloyl group represented by the following Formula (3) is preferable.

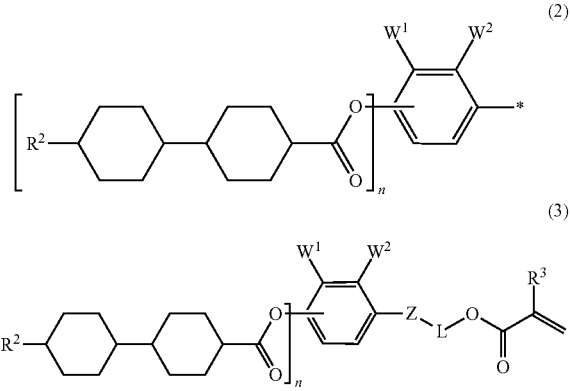

Here, in the above Formula (2), * represents a bonding position.

In addition, in the above Formulae (2) and (3), $R^2$ represents a linear alkyl group having 1 to 10 carbon atoms and n represents 1 or 2.

In addition. $W^1$ and $W^2$ each represent a hydrogen atom, an alkyl group, an alkoxy group, or a halogen atom, or $W^1$ and $W^2$ may be bonded to each other to form a ring structure which may have a substituent.

Further, in the above Formula (3), Z represents —COC— or —OCO—, L represents an alkyl group having 1 to 6 carbon atoms, and $R^3$ represents a hydrogen atom or a methyl group.

In addition, $R^2$ in the above Formulae (2) and (3) is preferably a linear alkyl group having 2 to 4 carbon atoms.

Specific examples of such an alkyl cyclohexane ring-containing compound include compounds represented by the following Formulae A-1 to A-6. In the following Formula A-3, $R^4$ represents an ethyl group or a butyl group.

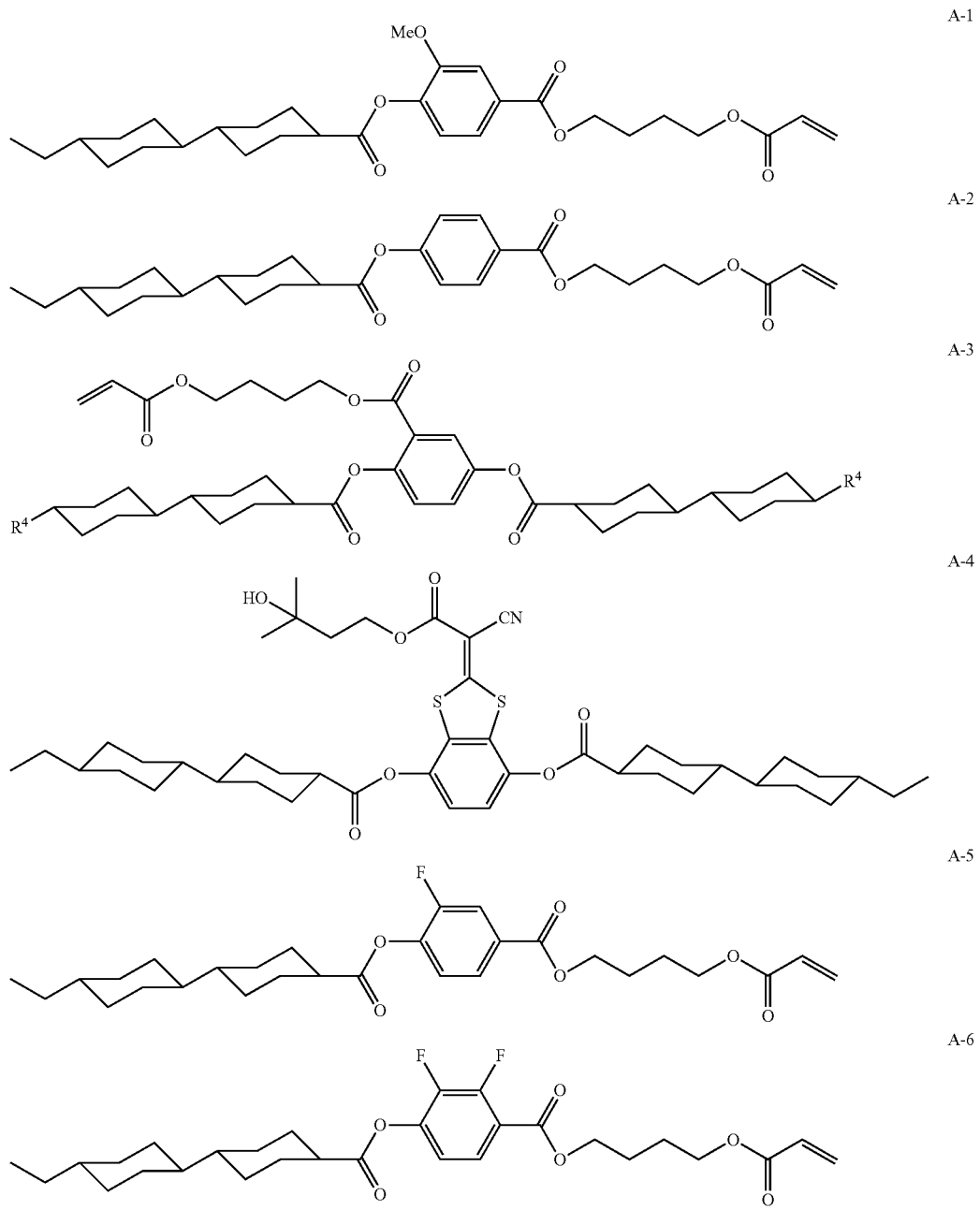

In the present invention, from the results using the compounds represented by the above Formulae A-1 to A-6, which will be described later, in the above Formulae (2) and (3), $W^1$ and $W^2$ are preferably unsubstituted (hydrogen atoms) rather than being electron attracting substituents, and more preferably electron donating substituents rather than being unsubstituted (hydrogen atoms). Specifically, it is preferable that at least one of $W^1$ or $W^2$ is a hydrogen atom and the other is an alkoxy group or a hydrogen atom, and it is more preferable that one is a hydrogen atom and the other is an alkoxy group.

In the present invention, the average tilt angle of the smectic liquid crystal compound in the optically anisotropic layer is preferably 1.0° or less and more preferably 0.4° or less from the viewpoint of improving the optical compensation performance of the optically anisotropic layer.

Here, the average tilt angle is defined as an average value $((\theta1+\theta2)/2)$ obtained by carrying out fitting using a tilt angle $\theta1$ of one surface of the optically anisotropic layer (the alignment film surface of the optical film of the present invention) and a tilt angle $\theta2$ of the other surface (the air interface of the optical film of the present invention) as variables such that a calculation of angular dependence of the retardation value of the optically anisotropic layer coincides with the measured value and calculating $\theta1$ and $\theta2$.

In addition, in the present invention, from the viewpoint of improving display performance without lowering the panel contrast, the alignment order parameter of the optically anisotropic layer is preferably 0.8 or greater and 1.0 or less.

Here, the alignment order parameter (hereinafter, also abbreviated as "S") is a value used as an index for indicating the degree of a polymer film orientation and the degree of liquid crystal orientation and is defined within a range of $0 \leq S \leq 1$. $S=0$ indicates a completely random state such as a liquid state. $S=1$ indicates a state in which molecules are completely aligned in one direction without fluctuation of molecules such as liquid crystals.

The alignment order parameter in the specification is a value obtained through measurement using a spectrophotometer (UV-3100PC, manufactured by Shimadzu Corporation) under the measurement conditions of an excitation laser wavelength of 532 nm and an excitation laser output of about 400 μW in the sample portion by attaching a depolarization element to the front portion of the spectrophotometer.

Further, in the present invention, from the viewpoint of imparting excellent viewing angle properties, the in-plane retardation Re (450) of the optically anisotropic layer at a wavelength of 450 nm and the in-plane retardation Re (550) of the optically anisotropic layer at a wavelength of 550 nm are preferably satisfy the following Expression (I).

$$0.75 \leq Re(450)/Re(550) \leq 1.00 \qquad \text{Expression (I)}$$

Here, the in-plane retardation value refers to a value measured by making light having a measurement wavelength incident to the layer in the film normal direction with Axo Scan (0PMF-1, manufactured by Axometrics Inc.).

In the present invention, although the thickness of the optically anisotropic layer is not particularly limited, the thickness thereof is preferably 0.1 to 10 μm and more preferably 0.5 to 5 μm.

In addition, in the present invention, as the method of forming the optically anisotropic layer, for example, a method of using a liquid crystal composition containing the above-described smectic liquid crystal compound and alkyl cyclohexane ring-containing compound, and arbitrary other liquid crystal compounds, a polymerization initiator, a solvent or the like to fix the alignment state of the smectic liquid crystal compound or the like may be used.

At this time, as the method of fixing the smectic liquid crystal compound, for example, a method of carrying out polymerization using a liquid crystal compound having a polymerizable group as the smectic liquid crystal compound to fix the alignment of the smectic liquid crystal compound or the like may be suitably used.

In the present invention, the optically anisotropic layer can be formed on an arbitrary support which will be described later or a polarizer in the polarizing plate of the present invention which will be described later.

[Support]

The optical film of the present invention may have a support as a substrate for forming the optically anisotropic layer as described above.

Such a support is preferably transparent and specifically, the support preferably has a light transmittance of 80% or more.

Examples of such a support include glass substrates and polymer films. Examples of the material for the polymer film include cellulose-based polymers; acrylic polymers having acrylic ester polymers such as polymethyl methacrylate, and lactone ring-containing polymers; thermoplastic norbornene-based polymers; polycarbonate polymers; polyester-based polymers such as polyethylene terephthalate and polyethylene naphthalate; styrene-based polymers such as polystyrene and acrylonitrile-styrene copolymers (AS resin); polyolefin-based polymers such as polyethylene, polypropylene, and ethylene-propylene copolymers; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers containing a mixture of these polymers.

In addition, the polarizer which will be described later may function as such a support.

In the present invention, although the thickness of the support is not particularly limited, the thickness thereof is preferably 5 to 60 μm and more preferably 5 to 15 μm.

[Alignment Film]

In the case in which the optical film has the above-described arbitrary support, the optical film of the present invention preferably has an alignment film between the support and the optically anisotropic layer. The above-described support may function as an alignment film.

The alignment film generally has a polymer as a main component. The materials for the polymer material for an alignment film are described in many documents and many commercially available products can be used.

The polymer material used in the present invention is preferably a polyvinyl alcohol, or a polyimide, or a derivative thereof. Particularly, a modified or non-modified polyvinyl alcohol is preferable.

Examples of alignment films that can be used in the present invention include alignment films described in Line 24 on Page 43 to Line 8 on Page 49 of WO01/88574A; modified polyvinyl alcohols described in paragraphs [0071] to [0095] of JP3907735B; and a liquid crystal alignment film formed by a liquid crystal aligning agent described in JP2012-155308A.

In the present invention, for the reason that surface state deterioration can be prevented by maximizing the utilization of a high alignment order parameter that the smectic liquid crystal has and avoiding a contact with the surface of the alignment film at the time of forming the alignment film, an optical alignment film is preferably used as the alignment film.

Although the optical alignment film is not particularly limited, polymer materials such as polyamide compounds and polyamide compounds described in paragraphs [0024] to [0043] of WO2005/096041A; a liquid crystal alignment film formed by a liquid crystal aligning agent having an optical alignment group described in JP2012-155308A; and LPP-JP265CP, product name, manufactured by Rolic technologies Ltd.

In addition, in the present invention, although the thickness of the alignment film is not particularly limited, from the viewpoint of forming an optically anisotropic layer having a uniform thickness by alleviating the surface roughness present on the support, the thickness thereof is preferably 0.01 to 10 μm, more preferably 0.01 to 1 μm, and still more preferably 0.01 to 0.5 μm.

[Hard Coat Layer]

The optical film of the present invention preferably has a hard coat layer for imparting film physical strength. Specifically, the hard coat layer may be provided on the side of the support opposite to the side on which the alignment film is provided (refer to FIG. 1B) or may be provided on the side of the optically anisotropic layer opposite to the side on which the alignment film is provided (refer to FIG. 1C).

As the hard coat layer, layers described in paragraphs [0190] to [0196] of JP2009-98658A can be used.

[Other Optically Anisotropic Layers]

The optical film of the present invention may have optically anisotropic layers other than the above-described optically anisotropic layer containing the smectic liquid crystal compound and the alkyl cyclohexane ring-containing compound (hereinafter, simply referred to as "optically anisotropic layer of the present invention" in the paragraph). That is, the optical film of the present invention may have a laminated structure of the optically anisotropic layer of the present invention and other optically anisotropic layers.

Such other optically anisotropic layers are not particularly limited as long as the optically anisotropic layers include liquid crystal compounds other than the above-described smectic liquid crystal compound.

Here, generally, liquid crystal compounds are classified into a rod-like type and a disk-like type according to the shape thereof. Further, each includes a low molecular type and a high molecular type. The term "high molecular" generally refers to a compound having a degree of polymerization of 100 or more (Polymer Physics-Phase Transition Dynamics, by Masao Doi, p. 2, published by Iwanami Shoten, Publishers, 1992). In the present invention, any type of liquid crystal compound can be used, but a rod-like liquid crystal compound or a discotic liquid crystal compound (disk-like liquid crystal compound) is preferably used. Two or more types of rod-like liquid crystal compounds, two or more types of disk-like liquid crystal compounds, or a mixture of a rod-like liquid crystal compound and a disk-like liquid crystal compound may be used. In order to fix the above-described liquid crystal compound, the liquid crystal layer is more preferably formed using a rod-like liquid crystal compound or disc-like liquid crystal compound having a polymerizable group, and the liquid crystal compound still more preferably has two or more polymerizable groups in one molecule. In the case of a mixture of two or more types of the liquid crystal compounds, at least one type of liquid crystal compound preferably has two or more polymerizable groups in one molecule.

As the rod-like liquid crystal compound, for example, the rod-like liquid crystal compounds described in claim 1 of JP1999-513019A (JP-H11-513019A) or paragraphs [0026] to [0098] of JP2005-289980A can be preferably used, and, as the discotic liquid crystal compounds, for example, the discotic liquid crystal compounds described in paragraphs [0020] to [0067] of JP2007-108732A and paragraphs [0013] to [0108] of JP2010-244038A can be preferably used, but the liquid crystal compounds are not limited thereto.

[Ultraviolet Absorbent]

The optical film of the present invention preferably includes an ultraviolet (UV) absorbent in consideration of effect of external light (particularly, ultraviolet rays) and more preferably includes an ultraviolet absorbent in the support.

As the ultraviolet absorbent, any of known ultraviolet absorbents can be used since ultraviolet absorbency can be exhibited. Among these ultraviolet absorbents, in order to obtain a high ultraviolet absorbency and ultraviolet absorptivity (ultraviolet cutting ability) used for an electronic image display device, a benzotriazole-based or hydroxyphenyl triazine-based ultraviolet absorbent is preferable. In addition, in order to widen the ultraviolet absorption width, two types of ultraviolet absorbents having different maximum absorption wavelengths can be used in combination.

[Polarizing Plate]

A polarizing plate of the present invention has the above-described optical film of the present invention and a polarizer.

[Polarizer]

The polarizer of the polarizing plate of the present invention is not particularly limited as long as the polarizer is a member having a function of converting light into specific linearly polarized light, and conventionally known absorptive type polarizer and reflective type polarizer can be used.

An iodine-based polarizer, a dye-based polarizer using a dichroic dye, a polyene-based polarizer, and the like are used as the absorptive type polarizer. The iodine-based polarizer and the dye-based polarizer are a coating type polarizer and a stretching type polarizer, any one of these polarizers can be applied. However, a polarizer which is prepared by allowing polyvinyl alcohol to adsorb iodine or a dichroic dye and performing stretching is preferable.

In addition, examples of a method of obtaining a polarizer by performing stretching and dyeing in a state of a laminated film in which a polyvinyl alcohol layer is formed on a substrate include methods disclosed in JP5048120B, JP5143918B, JP4691205B. JP4751481B, and JP4751486B, and known technologies related to these polarizers can be preferably used.

A polarizer in which thin films having different birefringence are laminated, a wire grid type polarizer, a polarizer in which a cholesteric liquid crystal having a selective reflection range and a ¼ wavelength plate are combined, and the like are used as the reflective type polarizer.

Among these, a polarizer containing a polyvinyl alcohol-based resin (a polymer including —$CH_2$—CHOH— as a repeating unit, in particular, at least one selected from the group consisting of polyvinyl alcohol and an ethylene-vinyl alcohol copolymer) is preferable from the viewpoint of more excellent adhesiveness with respect to the resin layer which will be described below.

In the present invention, as described above, such a polarizer may function as the above-described support or may function as both the above-described support and alignment film.

In the present invention, although the thickness of the polarizer is not particularly limited, the thickness thereof is preferably 3 μm to 60 μm, more preferably 5 μm to 30 μm, and still more preferably 5 μm to 15 μm.

[Pressure Sensitive Adhesive Layer]

The polarizing plate of the present invention may have a pressure sensitive adhesive layer arranged between the optically anisotropic layer in the optical film of the present invention and the polarizer.

The pressure sensitive adhesive layer used for lamination of the optically anisotropic layer and the polarizer is, for example, a substance in which a ratio between storage elastic modulus G' and loss elastic modulus G" (tan δ=G"/G') is 0.001 to 1.5, where G' and G" are measured with a dynamic viscoelastometer. Such a substance includes a so-called pressure sensitive adhesive or readily creepable substance. As the pressure sensitive adhesive that can be used in the present invention, for example, a polyvinyl alcohol-based pressure sensitive adhesive may be used, but there is no limitation thereto.

[Image Display Device]

An image display device of the present invention is an image display device having the optical film of the present invention or the polarizing plate of the present invention.

The display element used for the image display device of the present invention is not particularly limited and examples thereof include a liquid crystal cell, an organic electroluminescent (EL) display panel, and a plasma display panel.

Among these, a liquid crystal cell and an organic EL display panel are preferable, and a liquid crystal cell is more preferable. That is, for the image display device of the present invention, a liquid crystal display device using a liquid crystal cell as a display element, and an organic EL display device using an organic EL display panel as a display element are preferable and a liquid crystal display device is more preferable.

[Liquid Crystal Display Device]

A liquid crystal display device as an example of the image display device of the present invention is a liquid crystal display device including the above-described polarizing plate of the present invention and a crystal cell.

In the present invention, it is preferable that the polarizing plate of the present invention is used for the polarizing plate of the front side, out of the polarizing plates provided on the both sides of the liquid crystal cell, and it is more preferable that the polarizing plate of the present invention is used for the polarizing plates on the front and rear sides.

Hereinafter, the liquid crystal cell constituting the liquid crystal display device will be described in detail.

<Liquid Crystal Cell>

The liquid crystal cell for use in the liquid crystal display device is preferably of a vertical orientation (VA) mode, an optically compensated bend (OCB) mode, an in-plane-switching (IPS) mode or a twisted nematic (TN) mode but the cell mode is not limited thereto.

In a TN mode liquid crystal cell, rod-like liquid crystal molecules are oriented substantially horizontally when no voltage is applied and are further oriented in a twisted manner in a range of 60° to 120°. The TN mode liquid crystal cell is most often used in a color TFT liquid crystal display device and is mentioned in many literatures.

In a VA mode liquid crystal cell, rod-like liquid crystal molecules are oriented substantially vertically when no voltage is applied. Examples of the VA mode liquid crystal cells include (1) a narrowly defined VA mode liquid crystal cell (described in JP1990-176625A (JP-H02-176625A)) in which rod-like liquid crystal molecules are oriented substantially vertically when no voltage is applied and are oriented substantially horizontally when a voltage is applied, (2) a multi-domain VA mode (MVA mode) liquid crystal cell for enlarging the viewing angle (SID97, Digest of Tech. Papers (Proceedings) 28 (1997) 845), (3) a liquid crystal cell in a mode (n-ASM mode) in which rod-like liquid crystal molecules are oriented substantially vertically when no voltage is applied and are oriented in twisted multi-domain orientation when a voltage is applied (Proceedings of Japanese Liquid Crystal Conference, 58-59 (1998)), and (4) a SURVIVAL mode liquid crystal cell (presented in LCD International 98). The liquid crystal cell may be of any of patterned vertical orientation (PVA) type, optical orientation type and polymer-sustained orientation (PSA) type. These modes are described in detail in JP2006-215326A and JP2008-538819A.

In an IPS mode liquid crystal cell, rod-like liquid crystal molecules are oriented substantially horizontally with respect to a substrate and application of an electric field parallel to the substrate surface causes the liquid crystal molecules to respond planarly. The IPS mode displays black when no electric field is applied and a pair of upper and lower polarizing plates have absorption axes which are orthogonal to each other. A method of improving the viewing angle by reducing light leakage during black display in an oblique direction using an optical compensation sheet is described in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

As the organic EL display device which is an example of the image display device of the present invention, for example, an embodiment which includes, from the visible side, the polarizing plate of the present invention, a plate having a $\lambda/4$ function (hereinafter referred to also as "$\lambda/4$ plate") and an organic EL display panel in this order is suitable.

The "plate having $\lambda/4$ function" as used herein refers to a plate having a function of converting linearly polarized light at a specific wavelength into circularly polarized light (or circularly polarized light into linearly polarized light). Specific examples of an embodiment in which the $\lambda/4$ plate is of a single layer structure include a stretched polymer film, and a phase difference film in which an optically anisotropic layer having a $\lambda/4$ function is provided on a support. A specific example of an embodiment in which the $\lambda/4$ plate is of a multilayer structure includes a broadband $\lambda/4$ plate in which the $\lambda/4$ plate and $\lambda/2$ plate are laminated on each other.

The organic EL display panel is a display panel configured using an organic EL device in which an organic light emitting layer (organic electroluminescent layer) is sandwiched between electrodes (between a cathode and an anode).

The configuration of the organic EL display panel is not particularly limited but any known configuration is adopted.

EXAMPLES

The present invention will be described below in further detail based on examples. The materials, amounts used, ratios, treatments and treatment procedures shown in the examples below can be modified as appropriate in the range of not departing from the spirit of the present invention. Therefore, the scope of the present invention should not be construed as being limited to the following examples.

Example 1

<Formation of Optical Alignment Film P-1>

A coating solution 1 for an optical alignment film was prepared with reference to the description of Example 3 of JP2012-155308A.

The prepared coating solution 1 for an optical alignment film was applied to a glass substrate by a spin coating method to form a photoisomerizable composition layer 1.

The obtained photoisomerizable composition layer 1 was irradiated with polarized ultraviolet rays (500 mJ/cm$^2$, 750 W ultra-high pressure mercury lamp) to form an optical alignment film P-1.

<Formation of Optically Anisotropic Layer 1>

The coating solution 1 for an optically anisotropic layer was applied to on the optical alignment film P-1 having the following composition by a spin coating method to form a liquid crystal composition layer 1.

The formed liquid crystal composition layer 1 was once heated on a hot plate until a nematic phase (Ne phase) was exhibited and then cooled so that the alignment was stabilized in a smectic A phase (SmA phase).

Then, the alignment was fixed by the ultraviolet ray irradiation and an optically anisotropic layer 1 was formed. Thus, an optical film was prepared.

Coating Solution 1 for Optically Anisotropic Layer

Compound A-1 shown below 20.00 parts by mass
Liquid crystal compound L-1 shown below 40.00 parts by mass
Liquid crystal compound L-2 shown below 40.00 parts by mass
Polymerization initiator (IRGACURE 184, manufactured by BASF SE) 3.00 parts by mass
Polymerization initiator (IRGACURE OXE-01, manufactured by BASF SE) 3.00 parts by mass
Leveling agent (Compound T-1 shown below) 0.20 parts by mass
Cyclopentanone 423.11 parts by mass

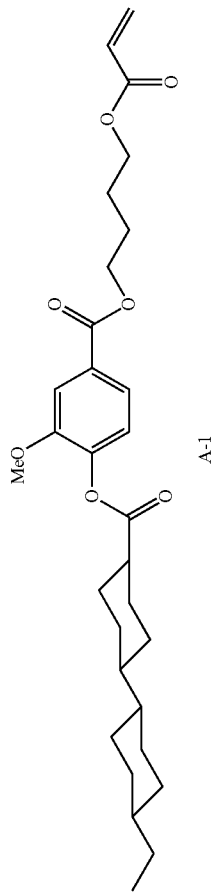

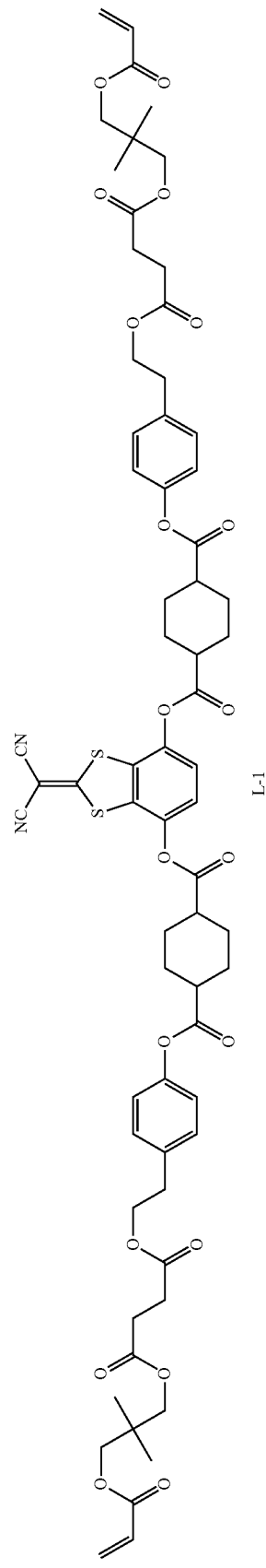

-continued
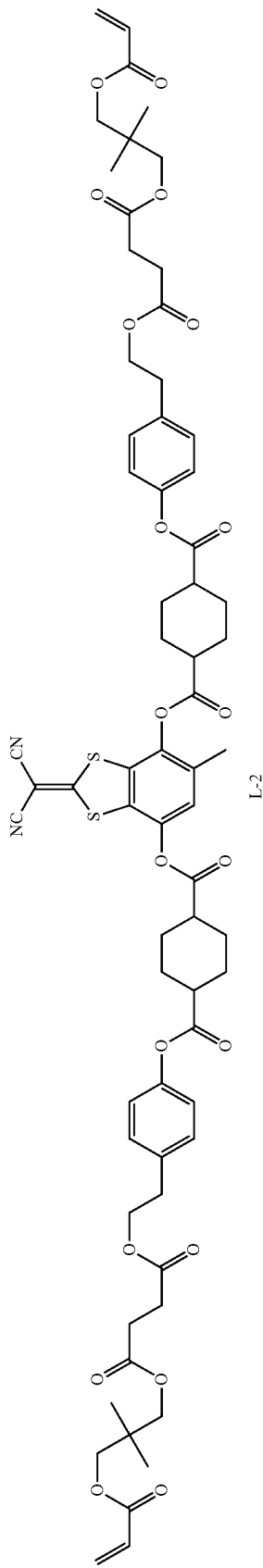
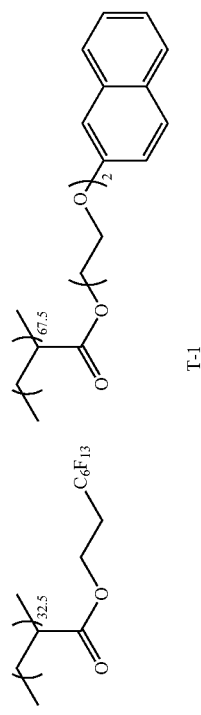

Examples 2 to 6 and Comparative Examples 1 to 9
Optically anisotropic layers 2 to 15 used in Examples 2 to 6 and Comparative Examples 1 to 9 were formed in the same manner as in Example 1 except that among compounds shown below, compounds shown in Table 1 below were used instead of Compound A-1 in Example 1.
A-2
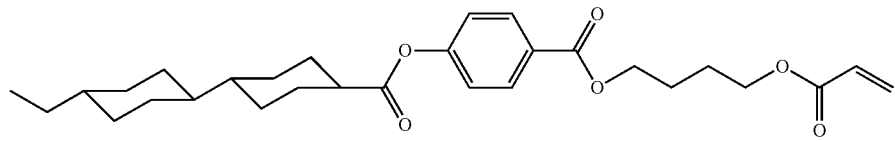
A-3
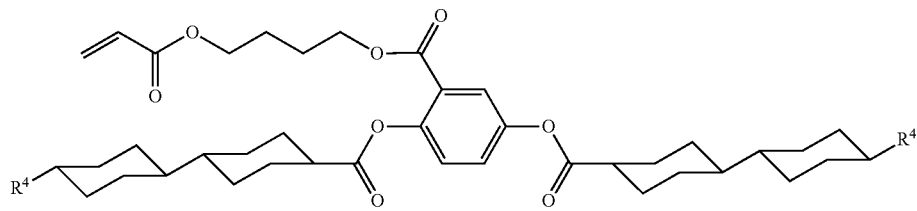
A-4
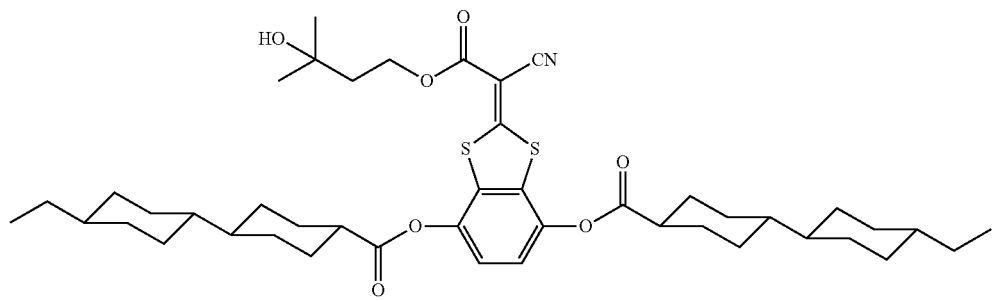
A-5
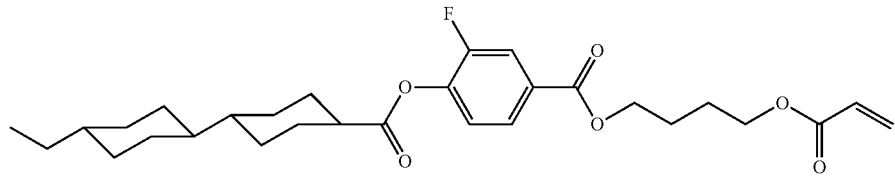
A-6
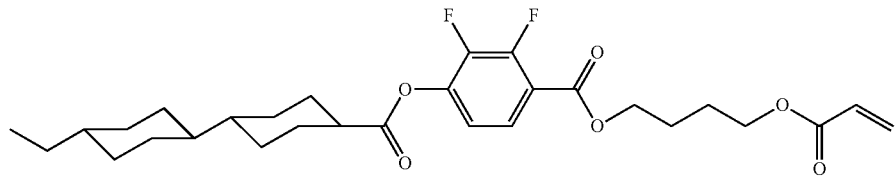
B-1
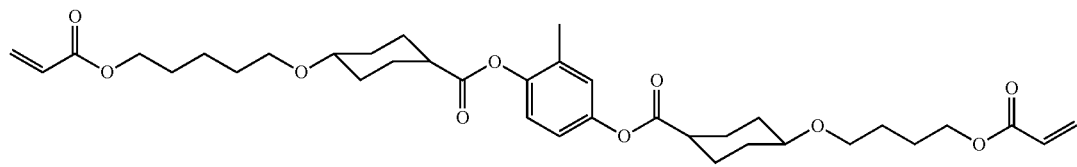
C-1
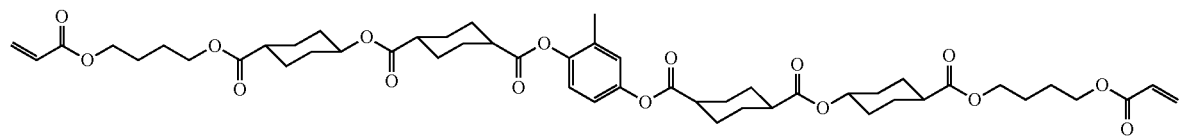

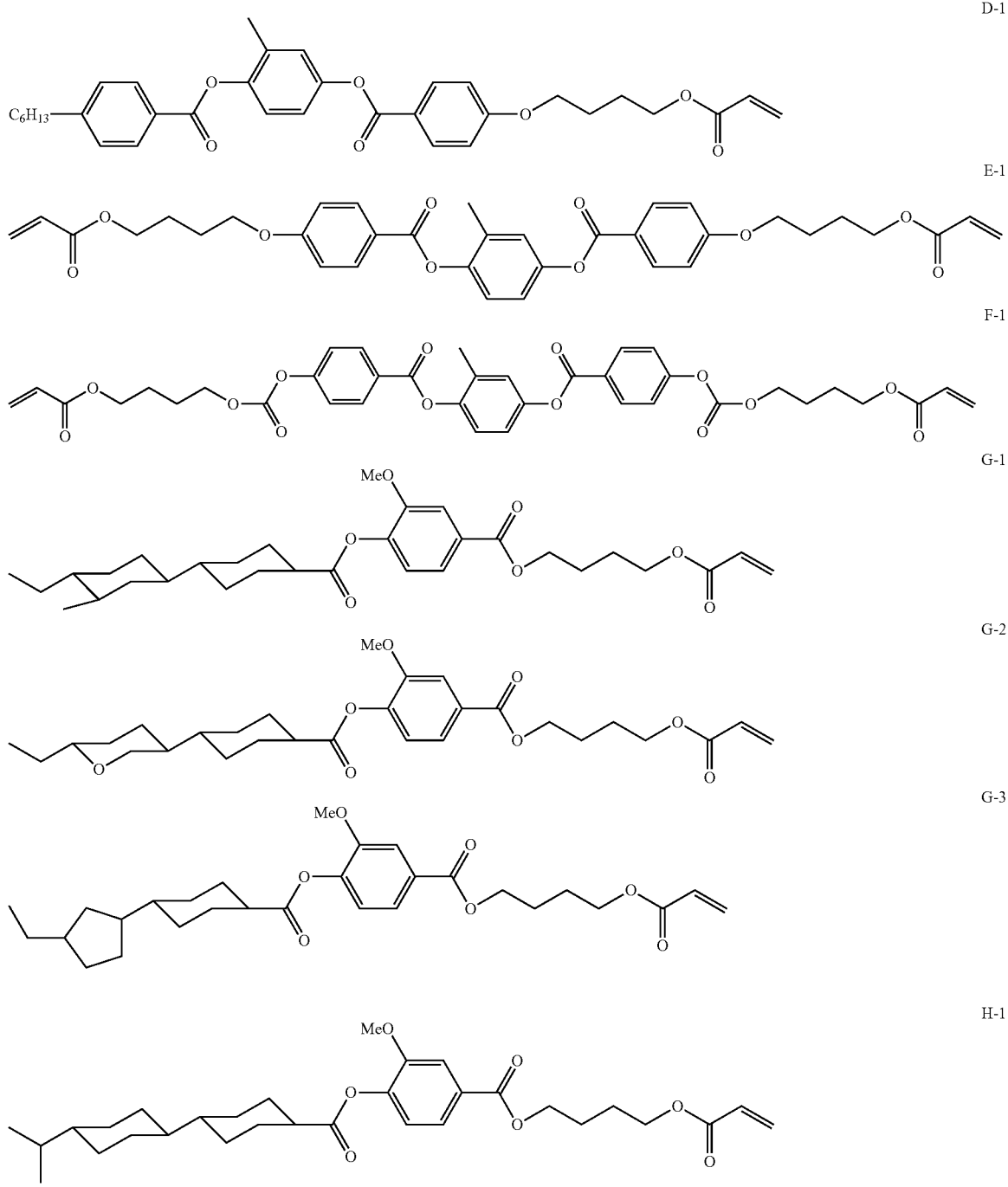

Comparative Example 10

An optically anisotropic layer 16 of Comparative Example 10 was formed in the same manner as in Example 1 except that a coating solution 16 for an optically anisotropic layer having the following composition was used instead of the coating solution 1 for an optically anisotropic layer in Example 1.

Coating Solution 16 for Optically Anisotropic Layer

| | |
|---|---|
| Liquid crystal compound L-1 shown above | 50.00 parts by mass |
| Liquid crystal compound L-2 shown above | 50.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

Comparative Example 11

An optically anisotropic layer 17 of Comparative Example 11 was formed in the same manner as in Example 1 except that a coating solution 17 for an optically anisotropic layer having the following composition was used instead of the coating solution 1 for an optically anisotropic layer in Example 1 and the alignment was fixed in a nematic phase.

Coating Solution 17 for Optically Anisotropic Layer

| | |
|---|---|
| Compound A-1 shown above | 20.00 parts by mass |
| Liquid crystal compound L-2 shown above | 80.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

Comparative Example 12

An optically anisotropic layer 18 of Comparative Example 12 was formed in the same manner as in Example 1 except that a coating solution 18 for an optically anisotropic layer having the following composition was used instead of the coating solution 1 for an optically anisotropic layer in Example 1 and the alignment was fixed in a nematic phase Coating Solution 18 for Optically Anisotropic Layer

| | |
|---|---|
| Liquid crystal compound L-2 shown above | 100.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

Example 7

An optically anisotropic layer 19 of Example 7 was formed in the same manner as in Example 1 except that a coating solution 19 for an optically anisotropic layer having the following composition was used instead of the coating solution 1 for an optically anisotropic layer in Example 1.

Coating Solution 19 for Optically Anisotropic Layer

| | |
|---|---|
| Compound A-1 shown above | 20.00 parts by mass |
| Liquid crystal compound L-3 shown below | 44.00 parts by mass |
| Liquid crystal compound L-4 shown below | 36.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

[Chemical structure L-3]

[Chemical structure L-4]

Comparative Example 13

An optically anisotropic layer 20 of Comparative Example 13 was formed in the same manner as in Example 1 except that that a coating solution 20 for an optically anisotropic layer having the following composition was used instead of the coating solution 1 for an optically anisotropic layer in Example 1.

Coating Solution 20 for Optically Anisotropic Layer 39

| | |
|---|---|
| Liquid crystal compound L-3 shown above | 55.00 parts by mass |
| Liquid crystal compound L-4 shown above | 45.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

Comparative Example 14

An optically anisotropic layer 21 of Comparative Example 14 was formed in the same manner as in Example 1 except that that a coating solution 21 for an optically anisotropic layer having the following composition was used instead of the coating solution 1 for an optically anisotropic layer in Example 1 and the alignment was fixed in a nematic phase.

Coating Solution 21 for Optically Anisotropic Layer

| | |
|---|---|
| Compound A-1 shown above | 20.00 parts by mass |
| Liquid crystal compound L-5 shown below | 64.00 parts by mass |
| Liquid crystal compound L-4 shown above | 16.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

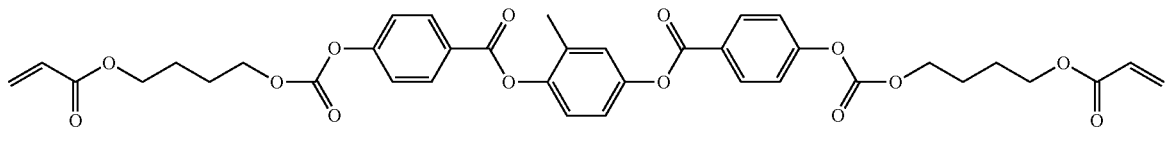

L-5

Comparative Example 15

An optically anisotropic layer 22 of Comparative Example 15 was formed in the same manner as in Example 1 except that that a coating solution 22 for an optically anisotropic layer having the following composition was used instead of the coating solution 1 for an optically anisotropic layer in Example 1 and the alignment was fixed in a nematic phase.

Coating Solution 22 for Optically Anisotropic Layer

| | |
|---|---|
| Liquid crystal compound L-5 shown above | 80.00 parts by mass |
| Liquid crystal compound L-4 shown above | 20.00 parts by mass |
| Polymerization initiator (IRGACURE 184, manufactured by BASF SE) | 3.00 parts by mass |

-continued

| | |
|---|---|
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

Example 8

An optically anisotropic layer 23 of Example 8 was formed in the same manner as in Example 1 except that a coating solution 23 for an optically anisotropic layer having the following composition was used instead of the coating solution 1 for an optically anisotropic layer in Example 1.

Coating Solution 23 for Optically Anisotropic Layer

| | |
|---|---|
| Compound A-1 shown above | 20.00 parts by mass |
| Liquid crystal compound L-6 shown below | 80.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

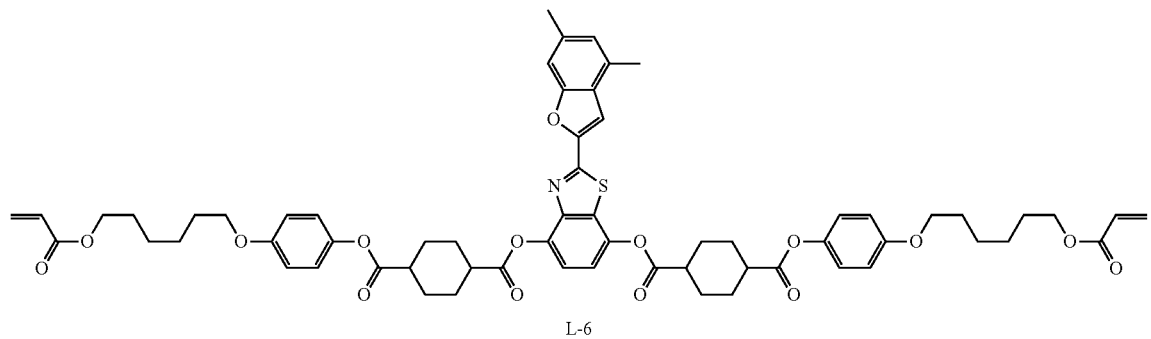 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c4sc(-c5cc6c(C)cc(C)cc6o5)nc34)CC2)cc1]

L-6

Comparative Example 16

An optically anisotropic layer 24 of Comparative Example 16 was formed in the same manner as in Example 1 except that a coating solution 24 for an optically anisotropic layer having the following composition was used instead of the coating solution 1 for an optically anisotropic layer in Example 1 and the alignment was fixed in a nematic phase.

Coating Solution 24 for Optically Anisotropic Layer

| | |
|---|---|
| Compound A-1 shown above | 20.00 parts by mass |
| Liquid crystal compound L-7 shown below | 80.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 described above) | 0.20 parts by mass |
| Cyclopentanone | 423.11 parts by mass |

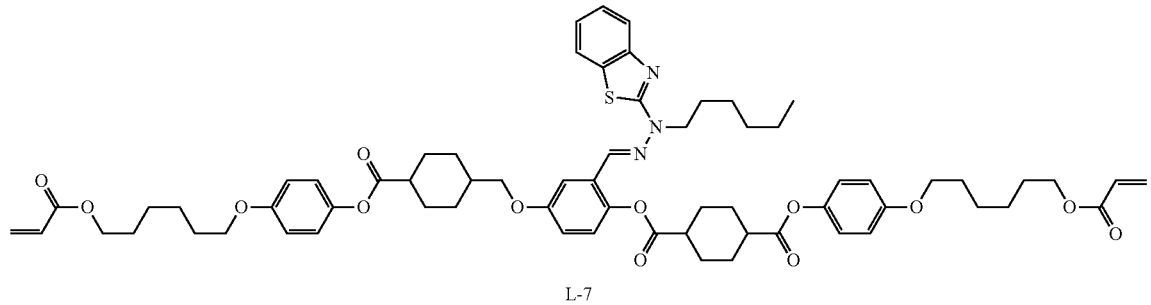 [SMILES: C=CC(=O)OCCCCCCOc1ccc(OC(=O)C2CCC(COc3ccc(OC(=O)C4CCC(C(=O)Oc5ccc(OCCCCCCOC(=O)C=C)cc5)CC4)c(/C=N/N(CCCCCC)c4nc5ccccc5s4)c3)CC2)cc1]

L-7

Example 9

<Formation of Optical Alignment Film P-2>

A photoisomerizable composition layer 2 was formed on a glass substrate with reference to the method described in Comparative Example 1 of JP2013-250571A.

The obtained photoisomerizable composition layer 2 was irradiated with polarized ultraviolet rays (500 mJ/cm², 750 W ultra-high pressure mercury lamp) to form an optical alignment film P-2.

An optically anisotropic layer 25 of Example 9 was formed in the same manner as in Example 1 except that the above-described optical alignment film P-2 was used instead of the optical alignment film P-1 in Example 1.

Example 10

<Formation of Optical Alignment Film P-3>

An optical alignment film P-3 was formed in the same manner as in Example 1 except that a polarizer was used instead of the glass substrate in Example 1.

As the polarizer, a polarizer having a film thickness of 20 μm was prepared by making iodine be adsorbed onto a stretched polyvinyl alcohol film according to Example 1 of JP2001-141926A.

An optically anisotropic layer 26 of Example 10 was formed in the same manner as in Example 1 except that the above-described optical alignment film P-3 was used instead of the optical alignment film P-1 in Example 1.

Example 11

An optically anisotropic layer 27 of Example 11 was formed in the same manner as in Example 1 except that a coating solution 27 for an optically anisotropic layer having the following composition was used instead of the coating solution 1 for an optically anisotropic layer in Example 1.

Coating Solution 27 for Optically Anisotropic Layer

| | |
|---|---|
| Compound A-1 shown above | 12.50 parts by mass |
| Liquid crystal compound L-1 shown above | 43.75 parts by mass |
| Liquid crystal compound L-2 shown above | 43.75 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

Example 12

An optically anisotropic layer 28 of Example 12 was formed in the same manner as in Example 1 except that a coating solution 28 for an optically anisotropic layer having the following composition was used instead of the coating solution 1 for an optically anisotropic layer in Example 1.

Coating Solution 28 for Optically Anisotropic Layer

| | |
|---|---|
| Compound A-1 shown above | 20.00 parts by mass |
| Liquid crystal compound L-8 shown above | 44.00 parts by mass |
| Liquid crystal compound L-9 shown above | 36.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

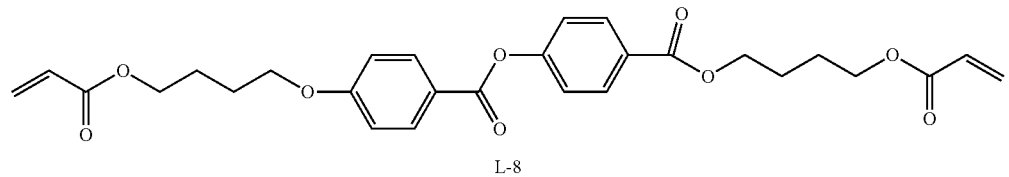 [SMILES: C=CC(=O)OCCCCOC(=O)c1ccc(OC(=O)c2ccc(OCCCCOC(=O)C=C)cc2)cc1]

L-8

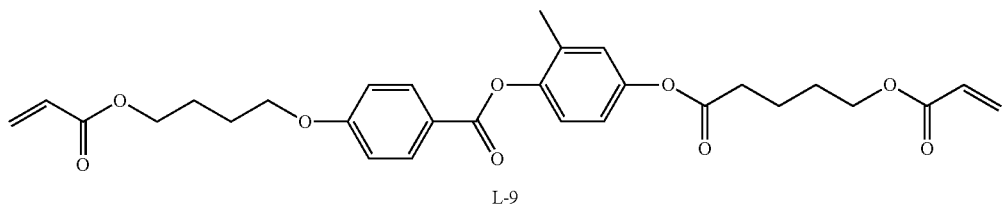 [SMILES: C=CC(=O)OCCCCOc1ccc(C(=O)Oc2ccc(OC(=O)CCCCOC(=O)C=C)cc2C)cc1]

L-9

Example 13

An optically anisotropic layer 29 of Example 13 was formed in the same manner as in Example 1 except that that a coating solution 29 for an optically anisotropic layer having the following composition was used instead of the coating solution 1 for an optically anisotropic layer in Example 1.

Coating Solution 29 for Optically Anisotropic Layer

| | |
|---|---|
| Compound A-1 shown above | 20.00 parts by mass |
| Liquid crystal compound L-10 shown below | 64.00 parts by mass |
| Liquid crystal compound L-11 shown below | 16.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Leveling agent (Compound T-1 shown above) | 0.20 parts by mass |
| Cyclopentanone | 423.11 parts by mass |

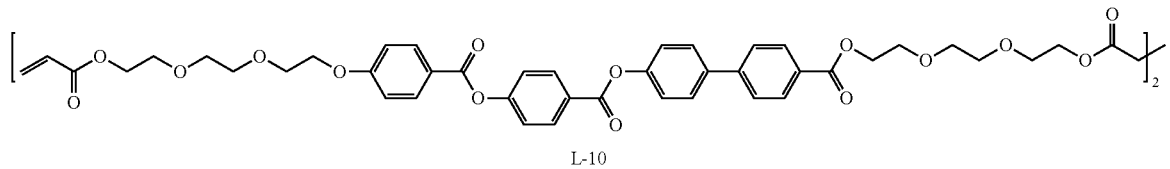

L-10

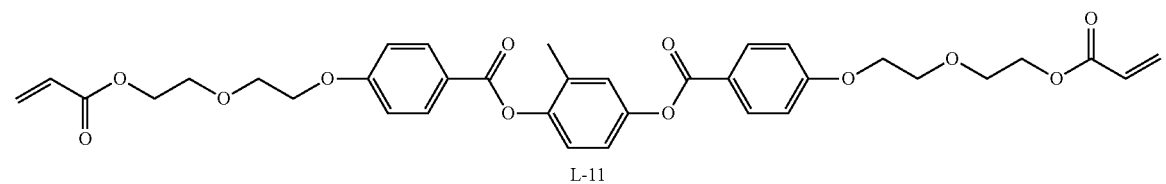 [SMILES: C=CC(=O)OCCOCCOc1ccc(C(=O)Oc2ccc(OC(=O)c3ccc(OCCOCCOC(=O)C=C)cc3)c(C)c2)cc1]

L-11

<Alignment State>

The optically anisotropic layer prepared in each of the above-described Examples and Comparative Examples was observed with a polarizing microscope in a state in which each layer was shifted by 2° from the extinction position and evaluated based on the following criteria. The results are shown in Table 1 below.

A: A liquid crystal director is finely orderly aligned and the display performance is very excellent.

B: A liquid crystal director is orderly aligned and the display performance is excellent.

C: A liquid crystal director is slightly orderly aligned.

D: A liquid crystal director is slightly disorderly aligned and the display performance is poor.

E: A liquid crystal director is significantly disorderly aligned, the surface state is not stabilized, and the display performance is significantly poor.

<Re(450)/Re(550)>

The values of Re(450) and Re(550) of the optically anisotropic layer prepared in each of the above-described Examples and Comparative Examples were respectively measured by making light at a wavelength of 450 nm and a wavelength of 550 nm incident to each layer in the film normal direction using Axo Scan (OPMF-1, manufactured by Axometrics Inc.) to calculate the values thereof. The results are shown in Table 1 below.

<Alignment Order Parameter>

The alignment order parameter of the optically anisotropic layer prepared in each of the above-described Examples and Comparative Examples was measured using a spectrophotometer (UV-3100PC, manufactured by Shimadzu Corporation). The results are shown in Table 1 below.

<Average Tilt Angle>

The optically anisotropic layer prepared in each of the above-described Examples and Comparative Examples was subjected to fitting using a tilt angle $\theta_1$ of one surface of the optically anisotropic layer and a tilt angle $\theta_2$ of the other surface as variables such that a calculation of angular dependence of the retardation value of the optically anisotropic layer coincided with the measured value to calculate $\theta_1$ and $\theta_2$ using Axo Scan (OPMF-1, manufactured by Axometrics Inc.) The average tilt angle was obtained from the average value (($\theta_1+\theta_2$)/2) of these values. The results are shown in Table 1 below.

Since the measurement limit of the device was ±1.0°, the tilt angle in the case in which a value of 1.0° or less was measured was shown as "≅0°".

In addition, the case in which the surface state became rough due to a dual domain or the like and thus correct measurement could not be performed was marked with "DD".

TABLE 1

| Table 1 | Liquid crystal compound 1 Type | Liquid crystal compound 1 Formulation amount (parts by mass) | Liquid crystal compound 2 Type | Liquid crystal compound 2 Formulation amount (parts by mass) | Additive Type | Additive Formulation amount (parts by mass) | Alignment film Type | Optically anisotropic layer Liquid crystal phase | Optically anisotropic layer Re(450)/Re(550) | Optically anisotropic layer Alignment order parameter | Optically anisotropic layer Alignment state | Optically anisotropic layer Average tilt angle |
|---|---|---|---|---|---|---|---|---|---|---|---|---|
| Example 1 | L-1 | 40 | L-2 | 40 | A-1 | 20 | P-1 | SmA | 0.89 | 0.93 | A | ≅0 |
| Example 2 | L-1 | 40 | L-2 | 40 | A-2 | 20 | P-1 | SmA | 0.86 | 0.91 | B | ≅0 |
| Example 3 | L-1 | 40 | L-2 | 40 | A-3 | 20 | P-1 | SmA | 0.85 | 0.90 | B | ≅0 |
| Example 4 | L-1 | 40 | L-2 | 40 | A-4 | 20 | P-1 | SmA | 0.77 | 0.88 | C | ≅0 |
| Example 5 | L-1 | 40 | L-1 | 40 | A-5 | 20 | P-1 | SmA | 0.86 | 0.89 | C | DD |
| Example 6 | L-1 | 40 | L-2 | 40 | A-6 | 20 | P-1 | SmA | 0.85 | 0.75 | C | DD |
| Comparative Example 1 | L-1 | 40 | L-2 | 40 | B-1 | 20 | P-1 | SmA | 0.86 | 0.86 | D | DD |
| Comparative Example 2 | L-1 | 40 | L-2 | 40 | C-1 | 20 | P-1 | SmA | 0.86 | 0.85 | D | DD |
| Comparative Example 3 | L-1 | 40 | L-2 | 40 | D-1 | 20 | P-1 | SmA | 0.86 | 0.86 | D | DD |
| Comparative Example 4 | L-1 | 40 | L-2 | 40 | E-1 | 20 | P-1 | SmA | 0.86 | 0.86 | D | DD |
| Comparative Example 5 | L-1 | 40 | L-2 | 40 | F-1 | 20 | P-1 | SmA | 0.86 | 0.87 | D | DD |
| Comparative Example 6 | L-1 | 40 | L-2 | 40 | G-1 | 20 | P-1 | SmA | 0.86 | 0.83 | E | DD |
| Comparative Example 7 | L-1 | 40 | L-2 | 40 | G-2 | 20 | P-1 | SmA | 0.86 | 0.84 | E | DD |
| Comparative Example 8 | L-1 | 40 | L-2 | 40 | G-3 | 20 | P-1 | SmA | 0.86 | 0.86 | D | DD |
| Comparative Example 9 | L-1 | 40 | L-2 | 40 | H-1 | 20 | P-1 | SmA | 0.86 | 0.83 | E | DD |
| Comparative Example 10 | L-1 | 50 | L-2 | 50 | — | — | P-1 | SmA | 0.86 | 0.86 | D | DD |
| Comparative Example 11 | — | — | L-2 | 80 | A-1 | 20 | P-1 | Ne | 0.89 | 0.70 | D | ≅0 |
| Comparative Example 12 | — | — | L-2 | 100 | — | — | P-1 | Ne | 0.89 | 0.71 | D | ≅0 |
| Example 7 | L-3 | 44 | L-4 | 36 | A-1 | 20 | P-1 | SmA | 1.13 | 0.90 | B | ≅0 |
| Comparative Example 13 | L-3 | 55 | L-4 | 45 | — | — | P-1 | SmA | 1.13 | 0.90 | D | DD |
| Comparative Example 14 | L-5 | 64 | L-4 | 16 | A-1 | 20 | P-1 | Ne | 1.20 | 0.63 | D | ≅0 |
| Comparative Example 15 | L-5 | 80 | L-4 | 20 | — | — | P-1 | Ne | 1.20 | 0.66 | D | ≅0 |
| Example 8 | L-6 | 80 | — | — | A-1 | 20 | P-1 | SmA | 0.90 | 0.89 | A | ≅0 |
| Comparative Example 16 | L-7 | 80 | — | — | A-1 | 20 | P-1 | Ne | 0.91 | 0.70 | D | ≅0 |
| Example 9 | L-1 | 40 | L-2 | 40 | A-1 | 20 | P-2 | SmA | 0.86 | 0.93 | A | ≅0 |
| Example 10 | L-1 | 40 | L-2 | 40 | A-1 | 20 | P-3 | SmA | 0.89 | 0.93 | A | ≅0 |
| Example 11 | L-1 | 43.75 | L-2 | 43.75 | A-1 | 12.5 | P-1 | SmA | 0.86 | 0.93 | A | ≅0 |
| Example 12 | L-8 | 44 | L-9 | 36 | A-1 | 20 | P-1 | SmA | 1.10 | 0.91 | B | ≅0 |
| Example 13 | L-10 | 64 | L-11 | 16 | A-1 | 20 | P-1 | SmA | 1.12 | 0.87 | C | ≅0 |

From the results shown in Table 1, it was found that in the cases in which the alkyl cyclohexane ring-containing compound used in the present invention was not formulated as the additive to be formulated with the liquid crystal compound, the alignment state was poor in all the cases (Comparative Examples 1 to 10, 12, 13, and 15). The additives used in Comparative Examples 6 and 9 were compounds in which the cyclohexane ring was substituted with a plurality of alkyl groups or branched alkyl groups but it was found that the alignment could not be improved when these compounds were added thereto.

It was found that even in the case in which the alkyl cyclohexane ring-containing compound was formulated, when the smectic liquid crystal compound was not formulated as the liquid crystal compound, the tilt angle was small but the alignment state was poor (Comparative Examples 11, 14, and 16).

In contrast, it was found that in the case in which the smectic liquid crystal compound and the alkyl cyclohexane ring-containing compound were formulated, the alignment of the optically anisotropic layer was satisfactory (Examples 1 to 13).

Particularly, from the comparison results of Examples 1, 2, and 3, and the comparison results of Examples 1 and 4 to 6, it was found that in the case in which the structure of the alkyl cyclohexane ring-containing compound had an electron rich aromatic ring, the alignment of the optically anisotropic layer was more satisfactory.

In addition, from the comparison of Examples 1 and 7, it was found that when the smectic liquid crystal compound was a compound having the structure represented by the above Formula (I), the alignment of the optically anisotropic layer was more satisfactory.

In addition, from the comparison of Examples 1 and 12, it was found that when the smectic liquid crystal compound was a compound having at least three ring structures selected from the group consisting of a benzene ring and a cyclohexane ring, the alignment of the optically anisotropic layer was more satisfactory.

Further, from the comparison of Examples 1 and 13, it was found that when the total number of benzene rings and cyclohexane rings included in the smectic liquid crystal compound was the same as the total number of benzene rings and cyclohexane rings included in other liquid crystal compounds, the alignment of the optically anisotropic layer was more satisfactory.

EXPLANATION OF REFERENCES

10: optical film
12 optically anisotropic layer
14: alignment film
16: support
18: hard coat layer

What is claimed is:

1. An optical film comprising at least:
an optically anisotropic layer,
wherein the optically anisotropic layer contains a smectic liquid crystal compound not including a fluorine atom and an alkyl cyclohexane ring-containing compound having a cyclohexane ring in which a hydrogen atom is substituted with a linear alkyl group,
wherein the smectic liquid crystal compound is a compound containing a structure represented by the following Formula (1),

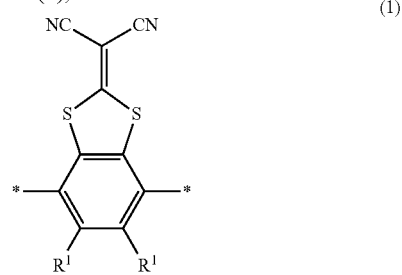

(1)

in the Formula (1), * represents a bonding position which bonds the structure of formula (1) to the remaining structure comprising the smectic liquid crystal compound, and $R^1$'s each independently represent a hydrogen atom or an alkyl group having 1 to 6 carbon atoms, and wherein the alkyl cyclohexane ring-containing compound is a compound having a (meth)acryloyl group represented by the following Formula (3),

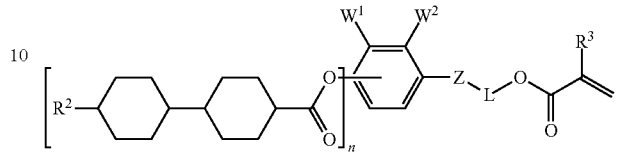

(3)

in the Formula (3), $R^2$ represents a linear alkyl group having 1 to 10 carbon atoms and n represents 1 or 2;

in the Formulae (3), $W^1$ and $W^2$ each represent a hydrogen atom, an alkyl group, an alkoxy group, or a halogen atom, or $W^1$ and $W^2$ may be bonded to each other to form a ring structure which may have a substituent; and in the Formula (3), Z represents —COC— or —OCO—, L represents an alkylene group having 1 to 6 carbon atoms, and $R^3$ represents a hydrogen atom or a methyl group.

2. An optical film comprising at least:
an optically anisotropic layer,
wherein the optically anisotropic layer contains a smectic liquid crystal compound not including a fluorine atom and an alkyl cyclohexane ring-containing compound having a cyclohexane ring in which a hydrogen atom is substituted with a linear alkyl group,
wherein the smectic liquid crystal compound is a compound represented by the following Formula L-1, a compound represented by the following Formula L-3, a compound represented by the following Formula L-6, a compound represented by the following Formula L-8, or a compound represented by the following Formula L-10:

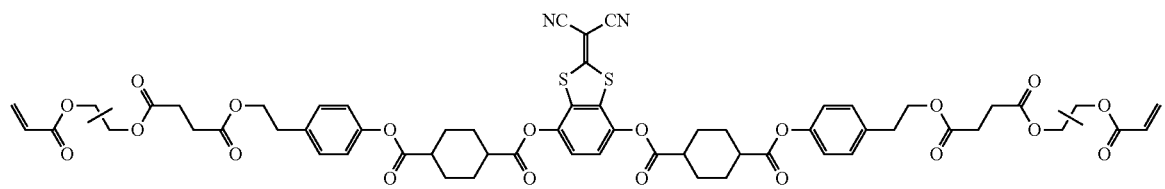

L-1

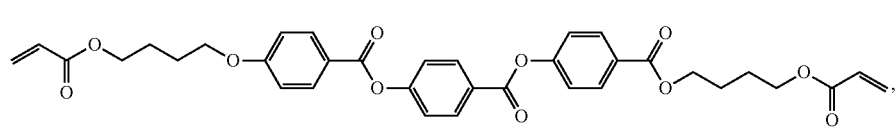

L-3

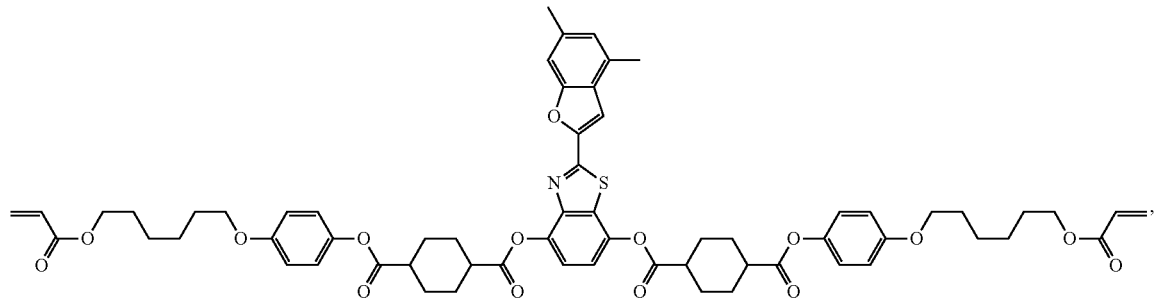

L-6

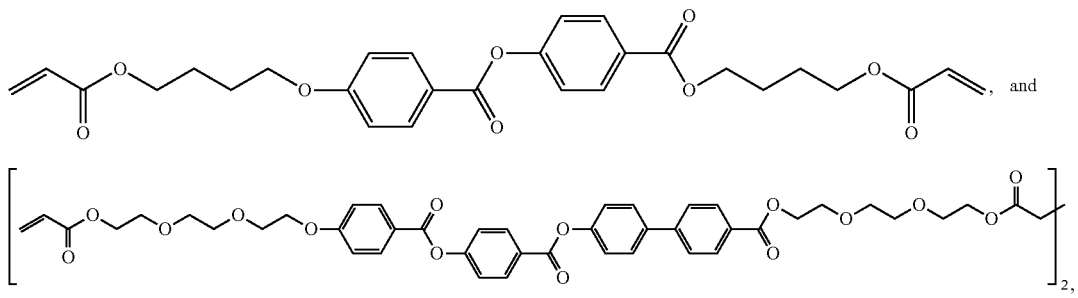

and wherein the alkyl cyclohexane ring-containing compound is a compound having a (meth)acryloyl group represented by the following Formula (3),

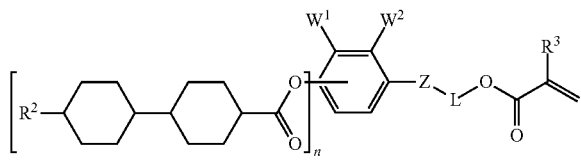

in the Formula (3), $R^2$ represents a linear alkyl group having 1 to 10 carbon atoms and n represents 1 or 2;

in the Formulae (3), $W^1$ and $W^2$ each represent a hydrogen atom, an alkyl group, an alkoxy group, or a halogen atom, or $W^1$ and $W^2$ may be bonded to each other to form a ring structure which may have a substituent; and in the Formula (3), Z represents —COC— or —OCO—, L represents an alkylene group having 1 to 6 carbon atoms, and $R^3$ represents a hydrogen atom or a methyl group.

3. The optical film according to claim 1, wherein an average tilt angle of the smectic liquid crystal compound in the optically anisotropic layer is 1.0° or less.

4. The optical film according to claim 2, wherein an average tilt angle of the smectic liquid crystal compound in the optically anisotropic layer is 1.0° or less.

5. The optical film according to claim 1, wherein an alignment order parameter of the optically anisotropic layer is 0.8 or greater and 1.0 or less.

6. The optical film according to claim 2, wherein an alignment order parameter of the optically anisotropic layer is 0.8 or greater and 1.0 or less.

7. The optical film according to claim 1, wherein the optically anisotropic layer further contains different liquid crystal compounds other than the smectic liquid crystal compound,
the smectic liquid crystal compound has benzene rings and/or cyclohexane rings,
the different liquid crystal compounds have benzene rings and/or cyclohexane rings, and
a total number of benzene rings and cyclohexane rings included in the smectic liquid crystal compound is the same as a total number of benzene rings and cyclohexane rings included in the different liquid crystal compounds.

8. The optical film according to claim 2, wherein the optically anisotropic layer further contains different liquid crystal compounds other than the smectic liquid crystal compound,
the smectic liquid crystal compound has benzene rings and/or cyclohexane rings,
the different liquid crystal compounds have benzene rings and/or cyclohexane rings, and
a total number of benzene rings and cyclohexane rings included in the smectic liquid crystal compound is the same as a total number of benzene rings and cyclohexane rings included in the different liquid crystal compounds.

9. A polarizing plate comprising:
the optical film according claim 1; and
a polarizer.

10. A polarizing plate comprising:
the optical film according to claim 2; and
a polarizer.

11. An image display device comprising:
the optical film according to claim 1.

12. An image display device comprising:
the optical film according to claim 2.

13. An image display device comprising:
the polarizing plate according to claim 9.

14. An optical film comprising at least:
an optically anisotropic layer,
wherein the optically anisotropic layer contains a liquid crystal compound and an alkyl cyclohexane ring-containing compound having a cyclohexane ring in which a hydrogen atom is substituted with a linear alkyl group,
wherein the alkyl cyclohexane ring-containing compound is a compound having a (meth)acryloyl group represented by the following Formula (3),

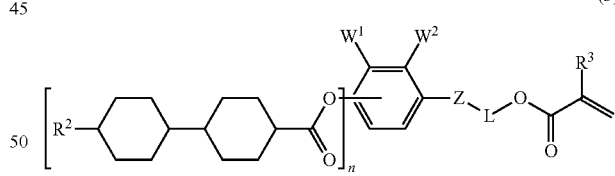

in the Formula (3), $R^2$ represents a linear alkyl group having 1 to 10 carbon atoms and n represents 1 or 2;

in the Formulae (3), $W^1$ and $W^2$ each represent a hydrogen atom, an alkyl group, an alkoxy group, or a halogen atom, or $W^1$ and $W^2$ may be bonded to each other to form a ring structure which may have a substituent; and in the Formula (3), Z represents —COC— or —OCO—, L represents an alkylene group having 1 to 6 carbon atoms, and $R^3$ represents a hydrogen atom or a methyl group, and wherein the liquid crystal compound is a compound represented by the following Formula L-1, a compound represented by the following Formula L-3, a compound represented by the following Formula L-6, a compound represented by the following Formula L-8, or a compound represented by the following Formula L-10:

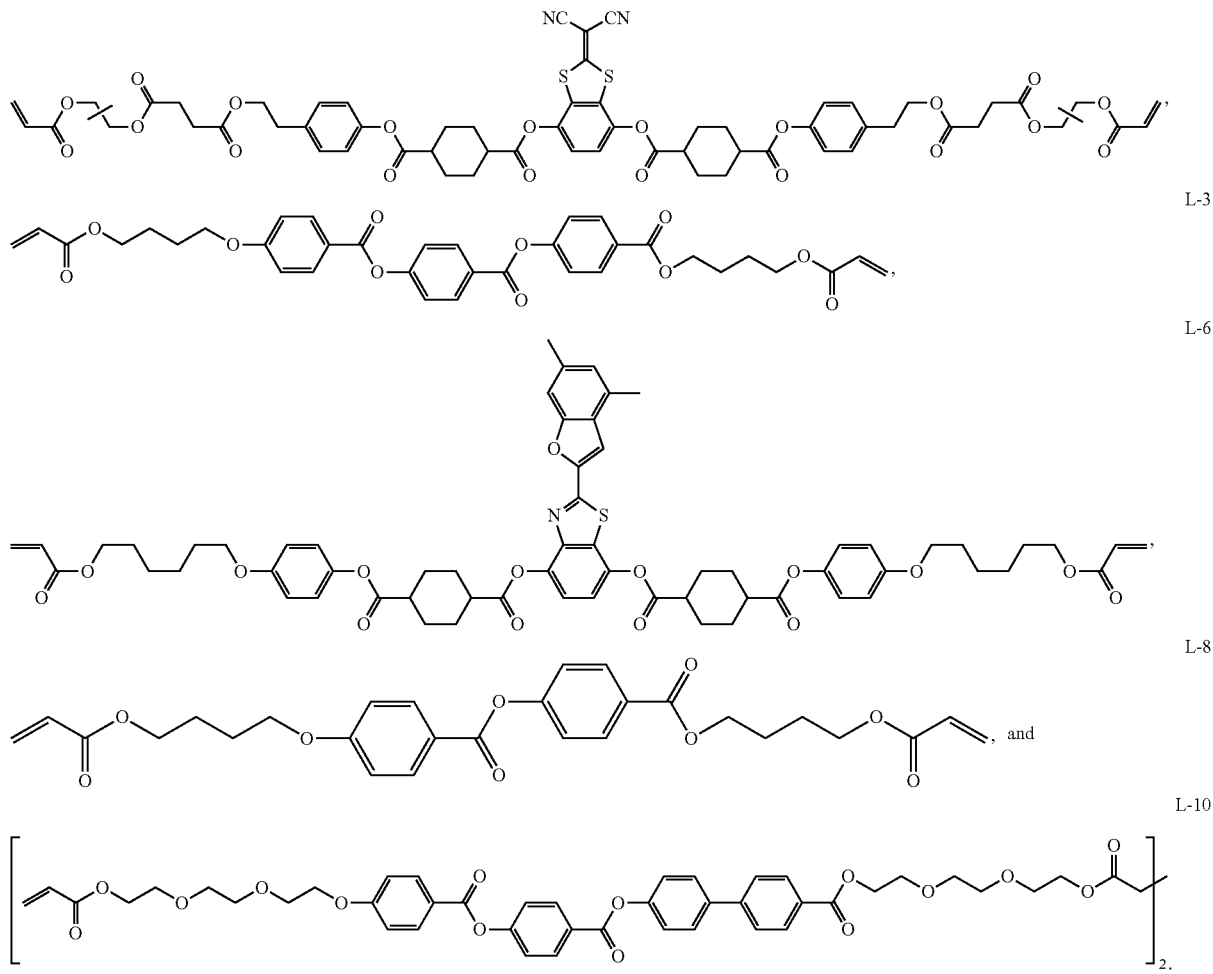

15. The optical film according to claim 14,
    wherein an average tilt angle of the liquid crystal compound in the optically anisotropic layer is 1.0° or less.
16. The optical film according to claim 14,
    wherein an alignment order parameter of the optically anisotropic layer is 0.8 or greater and 1.0 or less.
17. A polarizing plate comprising:
    the optical film according to claim 14; and
    a polarizer.
18. An image display device comprising:
    the optical film according to claim 14.

* * * * *